United States Patent
Nagpal et al.

(10) Patent No.: US 11,727,051 B2
(45) Date of Patent: Aug. 15, 2023

(54) PERSONALIZED IMAGE RECOMMENDATIONS FOR AREAS OF INTEREST

(71) Applicant: Adobe Inc., San Jose, CA (US)

(72) Inventors: Mansi Nagpal, Haryana (IN); Shreya Mahapatra, Chhattisgarh (IN); Sukhmeet Singh, Uttar Pradesh (IN)

(73) Assignee: Adobe Inc., San Jose, CA (US)

( * ) Notice: Subject to any disclaimer, the term of this patent is extended or adjusted under 35 U.S.C. 154(b) by 349 days.

(21) Appl. No.: 16/952,682

(22) Filed: Nov. 19, 2020

(65) Prior Publication Data
US 2022/0156312 A1     May 19, 2022

(51) Int. Cl.
*G06F 16/583* (2019.01)
*G06F 16/58* (2019.01)
(Continued)

(52) U.S. Cl.
CPC ...... *G06F 16/583* (2019.01); *G06F 16/24578* (2019.01); *G06F 16/535* (2019.01); *G06F 16/5866* (2019.01); *G06F 16/9535* (2019.01); *G06F 18/22* (2023.01); *G06F 40/30* (2020.01); *G06V 10/464* (2022.01);
(Continued)

(58) Field of Classification Search
CPC ............ G06F 16/583; G06F 16/24578; G06F 16/5866; G06F 40/30; G06F 16/535; G06F 16/9535; G06F 40/284; G06F 16/906; G06F 18/22; G06K 9/6215; G06V 30/194; G06V 10/464
See application file for complete search history.

(56) References Cited

U.S. PATENT DOCUMENTS 6,243,713 B1 * 6/2001 Nelson ............... G06F 16/40
704/235
8,781,255 B2 * 7/2014 Lin .................. G06V 10/464
382/291
(Continued)

OTHER PUBLICATIONS

Nelson, Nick About Netflix—The Power of a Picture, https://about.netflix.com/en/news/the-power-of-a-picture, Netflix, May 3, 2016, accessed Nov. 16, 2020, 6 pages.
(Continued)

*Primary Examiner* — Ping Y Hsieh
*Assistant Examiner* — Daniella M. DiGuglielmo
(74) *Attorney, Agent, or Firm* — Kilpatrick Townsend & Stockton LLP

(57) ABSTRACT

One example method involves operations for receiving a query that includes a keyword. The search query is associated with a user profile. Operations further include a recommendation matrix that includes a set of images based on (a) an area of interest determined from the search query and the user profile and (b) content tags associated with the images. In addition, operations include calculating a recommendation score for a candidate image included in the recommendation matrix. The recommendation score includes a weighted average of row vectors of the recommendation matrix. Further, operations involve including the candidate image in a search result for the search query based on the recommendation score. Additionally, operations include generating, for display, a search result that includes the candidate image.

20 Claims, 9 Drawing Sheets

(51) Int. Cl.
   *G06F 40/30*       (2020.01)
   *G06F 16/2457*     (2019.01)
   *G06V 30/194*      (2022.01)
   *G06F 18/22*       (2023.01)
   *G06F 16/535*      (2019.01)
   *G06F 16/9535*     (2019.01)
   *G06V 10/46*       (2022.01)
   *G06F 40/284*      (2020.01)
   *G06F 16/906*      (2019.01)

(52) U.S. Cl.
   CPC .......... *G06V 30/194* (2022.01); *G06F 16/906* (2019.01); *G06F 40/284* (2020.01)

(56) References Cited

U.S. PATENT DOCUMENTS

2008/0118151 A1* 5/2008 Bouguet .............. G06K 9/6253
                                                         382/181
2012/0323891 A1* 12/2012 Jacobson ................ G06F 16/43
                                                        707/E17.014

OTHER PUBLICATIONS

Wikipedia, "Bag-of-Words Model in Computer Vision", https://en.wikipedia.org/wiki/Bag-of-words_model_in_computer_vision, Oct. 20, 2020, accessed Nov. 16, 2020, 7 pages.

Adobe, "Building Composable AI with adobe Sensei Functions and Adobe I/O Runtime", Adobe Summit, https://opensource.adobe.com/adobe-sensei-ai-functions/, 2018, 2 pages.

Ma, Edward, Towards Data Science, "Word Distance Between Word Embeddings", https://towardsdatascience.com/word-distance-between-word-embeddings-cc3e9cf1d632, Aug. 25, 2018, 8 pages.

Wikipedia, "Word2vec", https://en.wikipedia.org/wiki/Word2vec, Oct. 24, 2020, accessed Nov. 16, 2020., 7 pages.

Radim Rehurek, "Word Mover's Distance", https://radimrehurek.com/gensim/auto_examples/tutorials/run_wmd.html, Gensim Topic Modelling for Humans, Nov. 4, 2020, accessed Nov. 16, 2020, 8 pages.

Github, Inc., "Adobe-Sensei-AI-Functions", https://github.com/adobe/adobe-sensei-ai-functions, 2018, accessed Nov. 17, 2020, 2 pages.

* cited by examiner

PERSONALIZED IMAGE RECOMMENDATIONS FOR AREAS OF INTEREST

TECHNICAL FIELD

This disclosure generally relates to image searching and, more specifically, to automatically generating personalized image recommendations for areas of interest, such as providing, in response to a search query, thumbnails or other image results that are personalized based on a user's areas of interest.

BACKGROUND

Image processing systems are used for providing various types of enhanced, altered, or modified images by end users who interact with image content. Image processing systems use a number of image databases or other repositories to provide image content. For instance, search engines executed on computing devices service queries for images of various content, such as people, landscapes, still life, impressions, wildlife, animals, portraits, their surrounding environment, etc.

While the search functionality of these software tools facilitate searches for image content, many end users seek personalized image content. But conventional software tools for servicing image queries are typically limited to generalized database searches. These generalized database searches, which are often targeted to ever-growing cloud-based libraries of image content, frequently produce suboptimal thumbnail results, fail to provide image results that are more relevant to a particular user.

For instance, existing computer-based methods attempt to provide similar search capabilities to millions of users seeking to locate thumbnails from among billions of images using more generalized searches, such as using a "last modified date" to classify image search results (e.g., artwork, graphics, photographic images, videos, etc.) as the most relevant results. But, in this "last modified date" example, the search engine could exclude images that have not been recently edited to be excluded from the image search results, even if these latter images are more relevant to a particular user of a search engine. Thus, existing techniques decrease the utility of software tools for servicing image queries.

SUMMARY

Certain aspects involve methods, systems and non-transitory computer-readable mediums having instructions stored thereon for generating personalized image results based on a user's areas of interest. For example, certain aspects described herein generates thumbnail representations of images that more closely match a user's interests based on user profile information. One example method involves one or more processing devices performing operations that include receiving a query that includes a keyword. The search query is associated with a user profile. Operations further include a recommendation matrix that includes a set of images based on (a) an area of interest determined from the search query and the user profile and (b) content tags associated with the images. In addition, operations include calculating a recommendation score for a candidate image included in the recommendation matrix. The recommendation score includes a weighted average of row vectors of the recommendation matrix. Further, operations involve including the candidate image in a search result for the search query based on the recommendation score. Additionally, operations include generating, for display, a search result that includes the candidate image.

Certain aspects described herein generates thumbnail representations of images that more closely match a user's area of interest using recommendation scores. For example, one example non-transitory computer-readable medium involves storing instructions that can be executed by one or more processing devices to perform operations that include receiving a search query comprising a keyword. The search query is associated with a user profile. Further, operations include selecting a set of images based on the keyword. Operations further include determining an area of interest based on both the search query and the user profile. In addition, operations include generating a recommendation matrix comprising a subset of the set of images based on the area of interest determined from the search query and the user profile. Operations further include calculating a recommendation score for a candidate image in the recommendation matrix, wherein the recommendation score comprises a weighted average of row vectors of the recommendation matrix, and wherein the weight to be applied for the weighted average of row vectors is based on both of the set of collaborator profiles and recency information. Further, operations include including the candidate image in the search result for the search query based on the recommendation score. Additionally, operations include generating, for display, the search result.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of this disclosure are better understood when the following Detailed Description is read with reference to the drawings.

DETAILED DESCRIPTION

Figure 1:
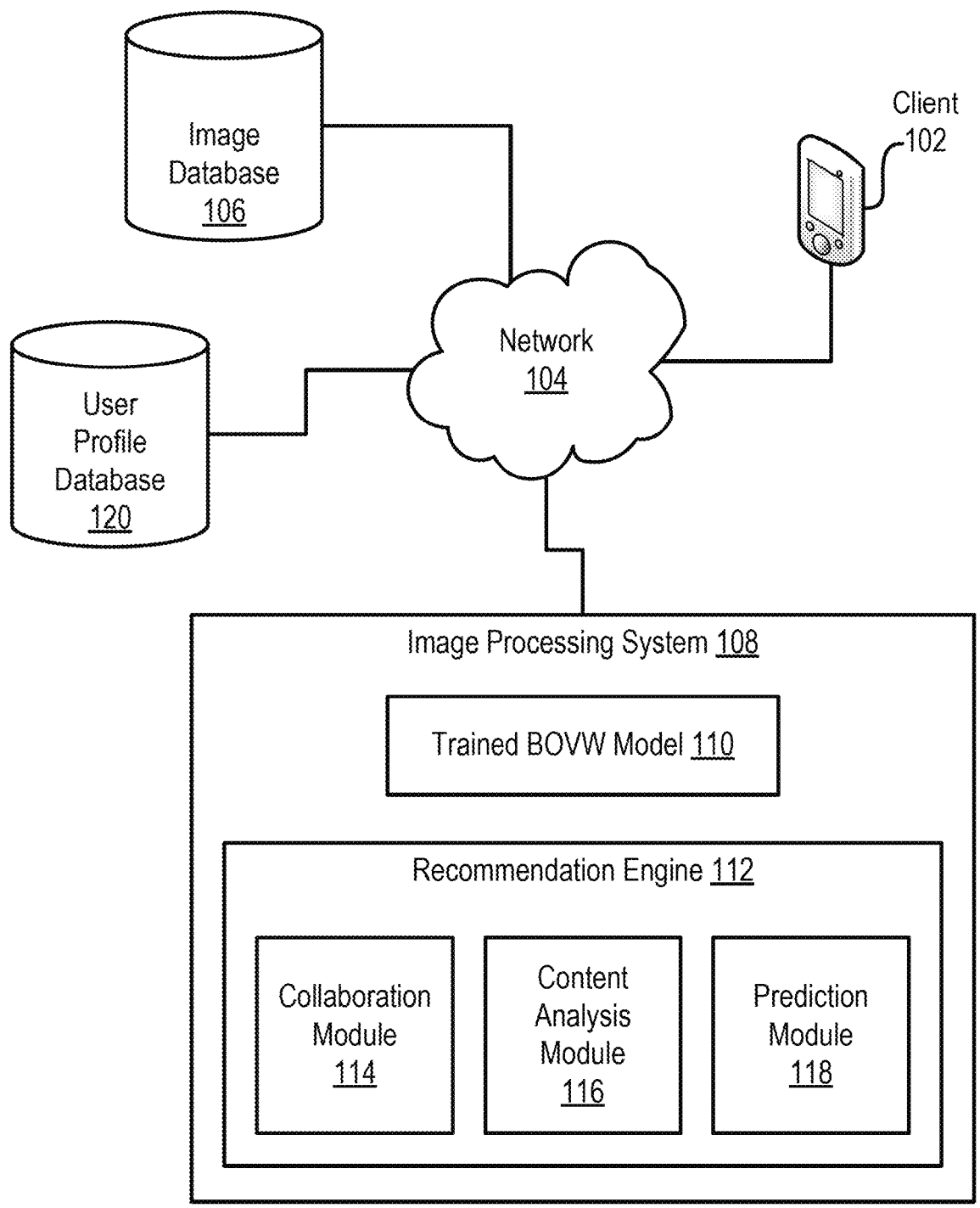
FIG. 1 depicts an example of a computing environment for personalized image generation and recommendations, according to certain aspects of this disclosure.

Certain aspects involve generating personalized image results based on a user's areas of interest. For example, as noted above, existing search engines often lack utility with respect to personalizing image content to a particular user when servicing image queries. Certain aspects described herein address these issues by, for example, generating personalized image results based on a user's areas of interest. For instance, software tools that service image queries using the techniques described herein generate thumbnail representations of images that more closely match a user's interests based on user profile information.

The following non-limiting examples are provided to introduce certain aspects of this disclosure. For example, the image processing system receives an input from a client device (e.g., a user input, request, button press, graphical user interface ("GUI") selection, text input, speech-to-text input, gesture, etc.) that includes a query for a personalized image recommendation. To service the query, the image processing system services accesses a set of assets (e.g., a collection of candidate images) to identify relevant candidate images based on a user history (e.g., interactions with online content by user devices associated with the user). The image processing system also identifies, as collaborators, other users with similar user histories. The image processing system can leverage the user's history and the collaborators' histories to identify candidate images among the set of assets. For instance, the image processing system selects, from the set of assets, candidate images based on a similarity, correlation, or correspondence among more collaborator histories.

The image processing system also identifies discrete characteristics of a relevant candidate image. The image processing system identifies these discrete characteristics using a trained bag of visual words ("BOVW") model that performs information retrieval and natural language processing. For instance, applying the trained BOVW model to image features of the candidate images generates sets of words for the candidate images. The sets of words include, for instance, annotations to the images, such as textual data, class labels, tags, etc.

Continuing with this example, the image processing system generates a recommendation matrix that represents the set of candidate images and discrete characteristics for the candidate images that have been identified with the BOVW model. The set of candidate images includes set of shared assets for a user associated with the query and a set of collaborator assets associated with collaborators. Generally, the set of candidate images represent potential recommendations for one or more search results that are included in response to a search query. In the recommendation matrix, each row corresponds to a group of images for a library of images. And the columns in the recommendation matrix correspond to a corpus of images stored in one or more repositories. In some examples, the corpus of images includes an entire collection of images that are associated with the requesting user.

In this example, the image processing system generates a recommendation score for the candidate images using a word mover's distance ("WMD") or other similar algorithm. The WMD identifies syntactic similarities, semantic similarities, or both between sets of words, such as the sets of words generated for the candidate images by the BOVW model. The WMD determines these similarities based on distances between vector embeddings that represent the sets of words (e.g., word embeddings). The image processing system determines the recommendation score based on a number or type of the similarities. For instance, the image processing system computes a recommendation score from weighted averages of row vectors in the recommendation matrix. The weights in these weighted averages represent, the user's history, a user's area of interest, a collaborator's shared area of interest, a collaborator's feedback, etc.

The image processing system responds to the query with one or more candidate images having sufficiently high recommendation scores. For instance, the image processing system selects candidate images having recommendation scores above a threshold or candidate images having the highest recommendation scores. The image processing system or another computing device that access the image processing system generates or updates a search result interface to include the selected candidate images.

Certain embodiments described herein provide improved image processing techniques for servicing queries for image content. For instance, an image processing system applies particular rules, such as the BOVW and the WMD techniques described above, to compute recommendation scores for candidate images in a recommendation matrix. These rules improve the utility of search engine software. For instance, an image processing system implemented according to certain aspects here generates search result interfaces for navigating to image sets that are personalized to the users. In an example, the image processing system facilitates the inclusion, within a graphical interface, of a clickable search result (e.g., a candidate image selected based on the recommendation matrix) for navigating to online image repositories. These techniques can therefore improve on conventional user interfaces by displaying more relevant search results more prominently. For instance, displaying navigable interface elements (e.g., a clickable thumbnail or other candidate image) customized to a user of a mobile device improves the utility of that mobile device by reducing the amount of scrolling or other navigating that might otherwise be required if less relevant search results were presented to the user.

Example Computing Environment for Generating Recommendations for Personalized Image Content Referring now to the drawings, FIG. 1 depicts an example of a computing environment 100 for personalized image generation and recommendations, according to certain aspects of this disclosure. In the example computing environment 100 depicted in FIG. 1, various client devices 102 access an image processing system 108 via a data network 104. In some aspects, as in the example computing environment 100 of FIG. 1, the image processing system 108 includes a trained bag of visual words ("BOVW") model 110 and a recommendation engine 112. In additional or alternative aspects, the trained BOVW model 110 and recommendation engine 112 could be implemented in separate, independently operated computing systems.

The image processing system 108 includes one or more devices that provide and execute one or more modules, engines, applications, etc. for providing one or more digital experiences to the user. The image processing system 108 can be implemented using one or more processing devices, e.g., one or more servers, one or more platforms with corresponding application programming interfaces, cloud infrastructure, and the like. In addition, each engine can also be implemented using one or more servers, one or more platforms with corresponding application programming interfaces, cloud infrastructure, and the like. The image processing system 108 uses the one or more processing devices to execute suitable program code for performing one or more functions. Examples of this program code include software components depicted in FIG. 1, such as the recommendation engine 112, collaboration module 114, content analysis module 116, and prediction module 118.

The image processing system 108 can use one or more of these engines to receive an input that includes a search query. As described in detail with respect to the various examples below, the image processing system 108 can use a trained BOVW model 110 to identify content tags associated with a corpus of images. In some examples, the image processing system 108 executes the recommendation engine 112 to generate personalized image content in response to a search query. In some aspects, the image processing 108 automatically generates image content (e.g., one or more thumbnail images) in response to a search query.

For instance, the recommendation engine 112 executes the prediction module 118 to select one or more images based on a user's area of interest. In some aspects, an area of interest is a category, classification, genre, field, technical field, or type of content that is associated with a user. In one example, the area of interest is stored as user profile information, for example, in a user profile database. In some examples, the area of interest is based on a user's history (e.g., a user's browsing history). In additional or alternative aspects, the area of interest includes user profile information or user data that corresponds to a user input. Some examples of user inputs include past user searches, content shared amongst contacts, a clickthrough rate ("CTR") associated with a type of content (e.g., wildlife photography, food images, landscape portraits, home improvement advertisements, etc.), a timing associated with the CTR (e.g., a duration of time evaluating content), a user preference, or another type of user input, etc.

Some aspects of the computing environment 100 include client devices 102. In one example, the client devices 102 are operated by client entities (e.g., commercial entities or content providers) requesting search results from a database of images (e.g., image database 106) using techniques discussed herein. Such requests can be performed by sending a search query (e.g., a text input) directly to the image processing system 108. In another example, the client devices 102 are operated by end users that desire to locate or view various image content of interest. For instance, an end user enters a user input that includes a request to perform a search for an image, collection of images, video, vlog, selfie, social media story, etc.

Examples of a client device 102 include, but are not limited to, a personal computer, a laptop, a tablet, a desktop, a server, a mobile device, a smartphone, a processing unit, any combination of these devices, or any other suitable device having one or more processors. A user of a client device 102 uses various products, applications, or services supported by the image processing system 108 via the data network 104.

Each of the client devices 102 are communicatively coupled to the image processing system 108 via the data network 104. Examples of the data network 104 include, but are not limited to, internet, local area network ("LAN"), wireless area network, wired area network, wide area network, and the like.

In the example computing environment 100, the image processing system 108 depicted in FIG. 1 executes the recommendation engine 112 to generate the personalized recommendation (e.g., a search result that includes image content). The image processing system 108 outputs the personalized image content to the requesting client device 102. In one example, outputting the personalized image content includes encoding and transmitting the produced image content to the client device 102. In some examples, the image processing system 108 encodes the personalized image content in any suitable image format (e.g., AVI, BGP, BMP, CGM, Exif, FLV, F4V, GIF, HDR, HEIF, HEVC, JPEG, MPEG, MP4, PNG, PPM, RIFF, SVG, TIFF, VC-1, VVC, WebP, XPS, or any other suitable imaging format). In other examples, outputting the target image includes electronically storing the target image, e.g., on a memory associated with the computing environment 100.

In one example, the image processing system 108 facilitates personalized image recommendations for areas of interest by generating a thumbnail image result. For example, the image processing system 108 receives an input from a client device 102 that includes a query for a personalized image recommendation. The image processing system 108 uses the trained BOVW model 110 or a recommendation engine 112 to provide the thumbnail image result to the client device 102.

For instance, the image processing system 108 uses the trained BOVW model 110 to perform functions that include information retrieval and Natural Language Processing ("NLP"). In some aspects, the BOVW an algorithm, program code, or a model that is adapted to perform its functions by identifying image features within images, which are the treated as words in the BOVW model. In some examples, BOVW includes annotating images with textual data or class labels that describes the content of a corresponding image.

In this example, the trained BOVW model 110 accesses a library of image content that includes collections of images having various image features. The trained BOVW model 110 treats the image features associated with each image as words. In some examples, the words include annotations to the images, such as textual data, class labels, tags, etc. Further, the trained BOVW model 110 uses the words corresponding to the image features to perform an image search. In some examples, the trained BOVW model 110 performs a more efficient search, for example, by searching a particular class or sub-class of images using search terms associated with the query.

For example, the trained BOVW model 110 performs functions that include annotating or tagging images. In some examples, the BOVW model 110 uses an autotagger to perform these functions. For example, the autotagger can extract tags based on a minimum confidence score corresponding to a class label. In this example, the autotagger uses a feature vector generator (e.g., a CNN) to generate feature vectors for assets. In some examples, the autotagger generates feature vectors for each image in a shared collection of images, e.g., including 1024 or 2048 dimensional feature vectors. In some examples, the feature vectors may be extracted using the expression:

$$F=\{f_i | i \in [0,n]\}$$

where F is a set of feature vectors, $f_i$|i represents latent features, and n is a feature dimension.

Further, the BOVW model 110 compresses large feature vectors from the autotagger. For example, the BOVW model 110 can reduce a size of a feature vector from 1024 or 2048 dimensions to a more manageable size (e.g., a 64-byte value). In some examples, the BOVW model 110 uses an encoder (e.g., a Haystack2 encoder or another suitable encoder) to encode compressed representations of the feature vectors. Further, the BOVW model 110 can use the Haystack2 encoder to generate Pqcodes that are the encoded, compressed representations of the feature vectors from the autotagger.

The BOVW model 110 also uses a Haystack model to divide the assets (e.g., the shared collection of images) into buckets. Buckets are groups of images within the shared collection of images that include similar image features. In some examples, the buckets are organized or classified, e.g., using bucket identifiers (e.g., bucket-ids). the BOVW model 110 obtains additional assets, for example, from collaborators (e.g., photographers, artists, other users, etc.). The BOVW model 110 can include these collaborator assets in the buckets. For example, the collaborator assets include annotations and/or tags that were created by collaborators. Collaborators can upload collaborator assets to an indexed elastic search database (e.g., image database 106).

The BOVW model 110 retrieves these collaborator assets from the image database 106. Further, the BOVW model 110 performs additional functions using both of the shared assets and the collaborator assets. For example, the BOVW model 110 retrieves shared assets and the collaborator assets and their corresponding tags, Pqcodes, and bucket-ids. The BOVW model 110 extracts Pqcodes and bucket-ids associated with each of the images among the shared assets and the collaborator assets.

Further, the BOVW model 110 retrieves the similar images from the corpus based on the closest Pqcode of each asset. The BOVW model 110 then computes tags based on the confidence score of the tags associated with the similar images. Each image of the shared library, as well as the collaborators, owned assets are associated with a bag of visual words. In some examples, the BOVW model 110 computes tags based on the confidence score of the tags associated with the similar images, using the expression:

$$d = \sum_{i=0}^{n} (pqcode1_i - pqcode2_i)^2$$

where d is one confidence score of the confidence scores, pqcode1 is a feature vector of the content tag associated with an image of the first set of images, pqcode2 is a feature vector of the content tag associated with an image of the second set of images, and where n is a feature dimension. Thus, each asset can be expressed as:

$$Ai=[(w1i,s1i)(w2i,s2i) \ldots (wti,sti)]$$

In some examples, the image processing system 108 uses the recommendation engine 112 to perform the image search in response to the query. For example, the recommendation engine 112 executes an algorithm to provide a personalized search result. In one example, the recommendation engine 112 generates a personalized search result using collaborative filtering. For instance, the recommendation engine 112 builds a model (e.g., collaboration module 114) that identifies relevant candidate images based on a user's past behaviors (e.g., a user history). The recommendation engine 112 provides the user's history to the collaboration module 114. Further, the collaboration module 114 uses the user history to identify collaborators (e.g., other users with similar user histories). The recommendation engine 112 can leverage the user's history and collaborators' histories to identify candidate images among a set of assets.

In some aspects, assets are images that are accessible by a user. These assets are included in groups, sets, collections, or repositories of stored images. In one example, assets include thumbnail images. In some examples, assets include still photographs, GIFs, videos, works of art, graphics, virtual objects, advertisements, clips, animations, etc. Further, in some examples, assets are related images or a group of images that are stored in a repository. In some examples, the repository stores shared assets. In other examples, the repository may belong to a collaborator.

For instance, a collaborator is a user or user profile that shares one or more similarities or characteristics with a requesting user. For example, when a user requests a recommendation for personalized image content, the image processing system described herein determines users and/or user profiles that share similar characteristics to a user profile of the requesting user. Shared characteristics include shared areas of interests, browsing histories, likes/dislikes, user preferences, etc. In some examples, the image processing system uses behavioral characteristics of collaborators to more accurately predict a recommendation of image content for the requesting user.

In another example, the recommendation engine 112 generates a personalized search result using a content-based approach. For instance, the recommendation engine 112 executes a content analysis module 116 to access a set of assets (e.g., a shared set of candidate images). In some examples, the recommendation engine 112 or content analysis module 116 accesses the set of assets from a shared database. For example, the content analysis module 116 accesses the image database 106 and identifies one or more discrete characteristics for a relevant candidate image. The content analysis module 116 uses these discrete characteristics to identify additional candidate images among the set of assets.

In some examples, the recommendation engine 112 employs a "hybrid" approach that combines the content-based and collaborative approaches described above. For example, the recommendation engine 112 uses the content-based approach to generate a recommendation matrix that includes a set of shared assets, a set of collaborator assets, and discrete characteristics for both sets of assets. The discrete characteristics include image features that are represented by words (e.g., a BOVW). The recommendation engine 112 executes the prediction module 118. The prediction module 118 filters the set of assets by applying weights to a recommendation matrix. In some examples, the prediction module 118 applies the weights to the recommendation matrix based on a similarity, correlation, or correspondence with one or more collaborator histories.

For instance, the prediction module 118 filters the set of assets using a WMD or another suitable algorithm. In some aspects, a WMD is an algorithm, program code, or model that is used to determine similarities between two documents or sentences. WMD uses vector embeddings and represents textual information as a weighted point cloud of embedded words (e.g., word embeddings). Further, WMD determines a distance between two documents having textual information, e.g., by calculating a minimum cumulative distance that words from a first textual document would need to "travel," in order to match a point cloud of a second textual document, exactly. In some examples, WMD employs both of a syntactic and a semantic approach to calculate similarities between textual information.

The prediction module 118 uses the WMD to identify similarities between multiple documents, sentences, set of words, BOVWs, etc. The prediction module 118 uses the WMD to determine word embeddings that represent the documents and/or sentences. These word embeddings include a weighted point cloud of embedded words. In some examples, the prediction module 118 uses the WMD to compute syntactic and semantic similarities between word embeddings. For example, the prediction module 118 may compute a similarity metric (e.g., WMD values) using the following expressions:

$$\min_{t \geq 0} \sum_{ij=1}^{n} T_{ij} C(i, j)$$

$$\sum_{j=1}^{n} T_{ij} = d_i \forall\, i \in \{1, \ldots, n\}$$

$$\sum_{i=1}^{n} T_{ij} = d_i \forall\, i \in \{1, \ldots, n\}$$

The prediction module 118 uses results from the WMD to generate recommendation scores for each of the candidate images. For example, the prediction module 118 uses the results from the WMD to generate the recommendation matrix that includes recommendation scores associated with candidate images having certain similarities. For example, the prediction module 118 generates the recommendation matrix based on similarities between candidate images from a set of shared assets and candidate images from a set of collaborator images. Further, in some examples, the prediction module 118 determines the recommendation score based on a number or type of such similarities. In one example, a recommendation matrix for a collaborator can be created using the following expression:

$$R \cdot M_i = [\;]_{n_v, n_s}$$

In this example, each cell of the recommendation matrix is filled using the similarity metric described above. For example, the corresponding similarities between images in the shared library and those of the collaborators can be added using the WMD values. For example, the following expression is used to fill each cell.

$$C_{i,j} = \sum_{f}^{F} \delta_f f_{i,j}$$

The prediction module 118 weighs these recommendation scores. For instance, the prediction module 118 calculates weighted averages of row vectors in the recommendation matrix. In one example, the prediction module 118 uses recency information from the user's history to determine a weight to be applied to the row vectors. In some examples, the weight is based on the user's history, a user's area of interest, a collaborator's shared area of interest, a collaborator's feedback, etc., or a combination of these.

In one example, the prediction module 118 determines candidate images for a recommendation by calculating an interest quotient. For instance, the prediction module 118 uses the recommendation matrix described above to calculate the interest quotient Q. In this example, the interest quotient Q is calculated using the following expression:

$$Q_j = \left\{ q \mid q \in \min_{j \in [0, n_s]} C_j \right\}$$

Further, the prediction module 118 determines candidate images for a recommendation by maintaining a diversification for the interest quotient described above. For instance, the prediction module 118 selects a candidate image (e.g., a thumbnail) that is correctly associated with the area of interest associated with a library of assets that reflects the collaborator's interest. In some examples, the prediction module 118 selects the top candidate images based on their respective interest quotients. But in this example, the prediction module 118 selects the candidate images by performing a dynamic bucketization for a min-max normalized set of interest quotients. Advantageously, doing so reduces a need to perform Z-score normalizations to eliminate outliers, while also maintaining the scaling of the interest quotients. In some examples, the diversification may be calculated using the following expression.

$$Q'_i = \frac{Q_i - {}^{min}_i Q}{{}^{max}_i Q - {}^{min}_i Q}$$

The prediction module 118 determines one or more candidate images for a recommendation based on the recommendation scores. For example, the prediction module 118 determines a sorted or ranked order of the candidate images for the recommendation based on a highest recommendation score. Further, the prediction module 118 determines a top three (3), five (5), ten (10), or any suitable number of images for the recommendation. The prediction module 118 provides the one or more recommended images to the recommendation engine 112 or the image processing system 108.

The image processing system 108 generates, for display, a search result that includes the one or more recommended images. In some examples, the image processing system 108 generates the search result based on the highest recommendation scores among the image results. Additionally, or in the alternative, the image processing system 108 generates the search result having multiple search results. The multiple search results may also be displayed based on the highest recommendation scores among the image results (e.g., in an order of prominence that reflects their respective recommendation scores). In some examples, the image processing system 108 provides a GUI that includes the query, search results, menu options, etc. to the requesting client device 102. Further, the image processing system 108 transmits a display signal that causes the client device 102 to output the GUI.

Example Processes for Generating Personal Image Content Recommendations

Figure 2:
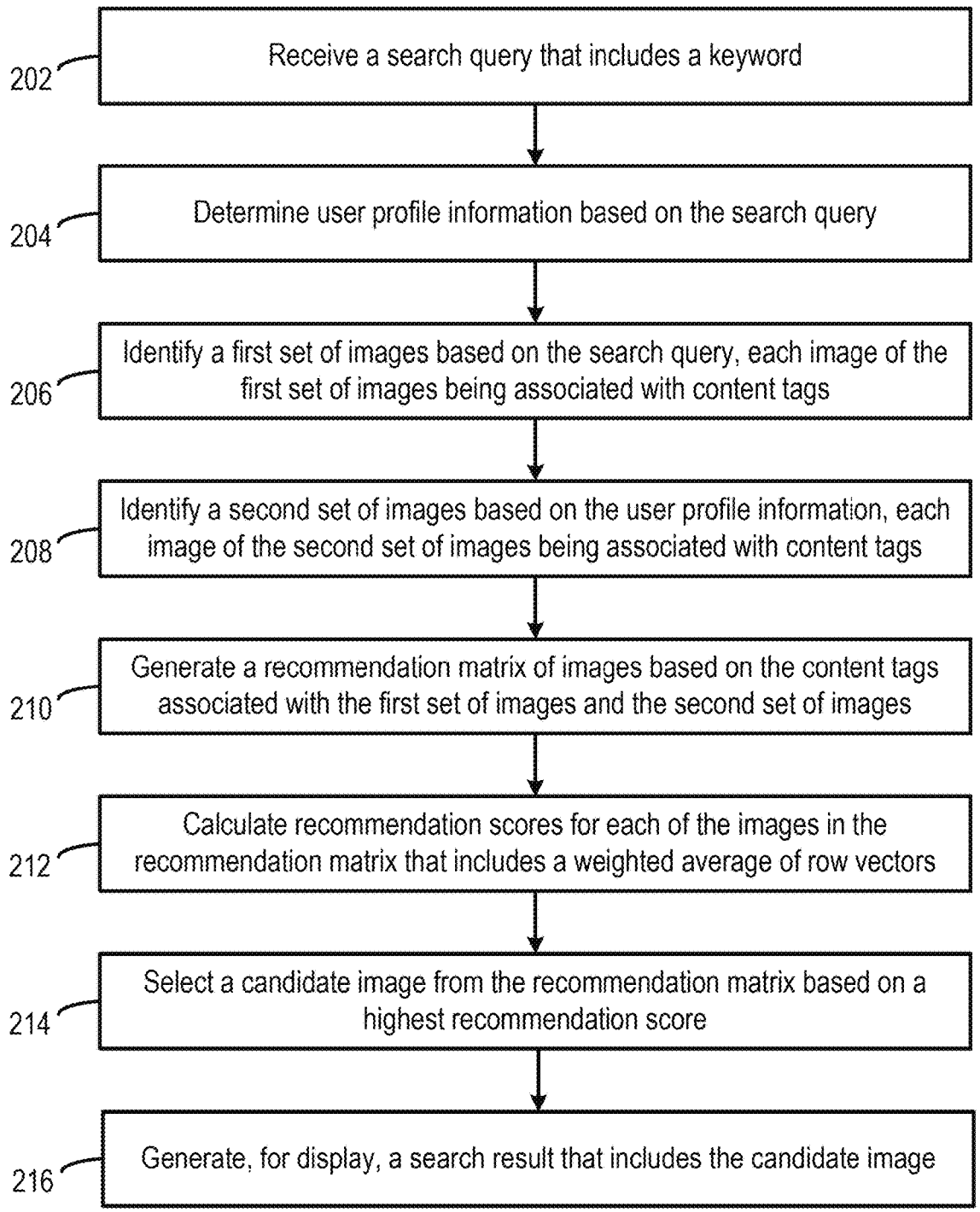
FIG. 2 depicts an example of a process for personalized image generation and recommendations, according to certain aspects of this disclosure.

FIG. 2 is an example of a process 200 for personalized image generation and recommendations, according to certain aspects of this disclosure. One or more operations described with respect to FIG. 2 can be used to generate personalized image content recommendations using an image processing system (e.g., image processing system 108). The image processing system 108 executes a trained machine learning model (e.g., trained BOVW model 110) and a recommendation engine 112 to provide personalized image content recommendations according certain aspects discussed herein. One or more processing devices (e.g., computing environment 100) implement operations depicted in FIG. 2 by executing suitable program code (e.g., trained BOVW model 110, recommendation engine 112, etc.). For illustrative purposes, the process 200 is described with reference to certain examples depicted in the figures. Other implementations, however, are possible.

At block 202, the process 200 involves receiving a search query that includes a keyword. In one example, the image processing system 108 receives a search query from a client device (e.g., client device 102). The image processing system 108 can receive the search query from any of the client devices 102 described above.

At block 204, the process 200 involves determining user profile information based on the search query. For example, the image processing system 108 retrieves a user profile that is associated with the search query from the user profile database 120. In some examples, the image processing system 108 retrieves the user profile based on a device ID, MAC address, username, another suitable form of identification, etc.

At block 206, the process 200 involves identifying a first set of images based on the search query, each image of the first set of images being associated with content tags. In some examples, the first set of images are assets included in a shared asset library, and the content tags are words that represent each image of the first set of images. The image processing system 108 identifies shared assets according to any of the techniques described herein.

At block 208, the process 200 involves identifying a second set of images based on the user profile information, each image of the second set of images being associated with content tags. In some examples, the second set of images are images included in collaborator assets. The image processing system 108 identifies collaborator images according to any of the techniques described herein.

At block 210, the process 200 involves generating a recommendation matrix of images based on the content tags associated with the first set of images and the second set of images. In some aspects, the recommendation matrix includes columns that correspond to a respective image from the first set of images. In one example, the columns corresponding to the images in the first set of images includes a corpus of images stored in one or more repositories. In some examples, each column corresponds to the respective image from the corpus of images that are associated with a requesting user's profile (e.g., a repository or an entire collection of the user's images). In other examples, the columns in the recommendation matrix include shared assets associated with a shared library. The recommendation matrix also includes rows that, in some aspects, correspond to the second set of images. In one example, the recommendation matrix includes content tags for the images in the second set of images that are associated with a collaborator and are a group of candidate images from a library of images, which is associated with the collaborator. The recommendation matrix, in some examples, includes values calculated by the image processing system 108 such as a WMD that is a measure of how similar two assets are. In some examples, the recommendation matrix includes any suitable number and type of calculated values for providing unique or personalized thumbnail recommendations.

At block 212, the process 200 involves calculating recommendation scores for each of the images in the recommendation matrix that includes a weighted average of row vectors. The recommendation scores are, in some cases, a sum of the WMD values that are calculated as described above, e.g., with respect to block 210. Further, the image processing system 108 uses these WMD values to add weighs to the recommendation matrix, e.g., using any number of factors.

In some examples, these factors include boost values and decay values. Boost values are determined at least in part from a frequency of interaction with each image or each asset, and decay values are determined at least in part by a recency of each image or each asset (e.g., a high recency value would accompany an image or an asset that was just posted). For example, a boost value is added when a user history includes interactions that occur over time that are related to an asset. Similarly, a decay value may be added over time, e.g., when a user history does not include interactions that are related to an asset. A boost value or decay value may be expressed as:

$$-\lambda N = dN/dt$$

where, $\lambda N$ represents an amount of activity of a user over time, dN represents a boost value associated with user interactions, and dt represents a decay value associated with user interactions. Rewritten, the boost value or decay value may be expressed as:

$$\text{Score(Day } i) = \text{Score(Day } 0) \times e^{(\lambda \cdot \Delta T)}$$

where the bigger the value for the decaying coefficient, the faster it decays.

At block 214, the process 200 involves selecting a candidate image from the recommendation matrix based on a highest recommendation score. In some examples, more than one candidate image is selected by the image processing system 108.

At block 216, the process 200 involves generating, for display, a search result that includes the candidate image. In some examples, the image processing system generates a search result that includes more than one candidate image.

Figure 3:
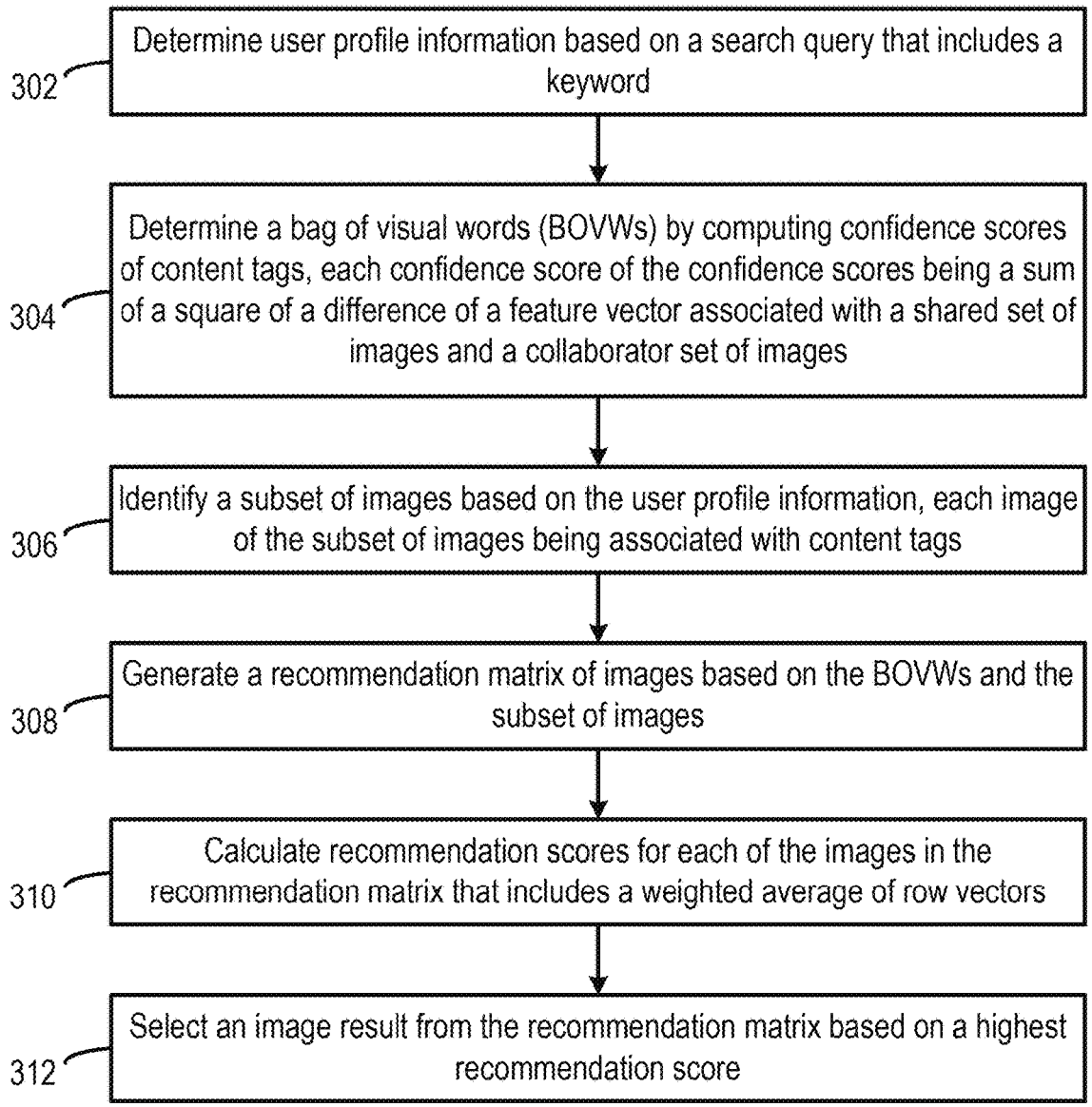
FIG. 3 depicts another example of a process for personalized image generation and recommendations, according to certain aspects of this disclosure.

FIG. 3 is an example of a process 300 for personalized image generation and recommendations, according to certain aspects of this disclosure. One or more operations described with respect to FIG. 3 can be used to generate personalized image content recommendations using an image processing system (e.g., image processing system 108). The image processing system 108 executes a trained machine learning model (e.g., trained BOVW model 110) and a recommendation engine 112 to provide personalized image content recommendations according certain aspects discussed herein. One or more processing devices (e.g., computing environment 100) implement operations depicted in FIG. 3 by executing suitable program code (e.g., trained BOVW model 110, recommendation 112, etc.). For illustrative purposes, the process 300 is described with reference to certain examples depicted in the figures. Other implementations, however, are possible.

At block 302, the process 300 involves determining user profile information based on a search query that includes a keyword. In one example, the image processing system 108 receives a search query from a client device (e.g., client device 102). The image processing system 108 can receive the search query from any of the client devices 102 described above.

At block 304, the process 300 involves determining a bag of visual words ("BOVW") by computing confidence scores associated with each of the content tags, each confidence score being a sum of a square of a difference of a feature vector associated with a shared set of images and a collaborator set of images. In some examples, the image processing system 108 determines the bag of visual words by calculating confidence scores of content tags associated with the shared set of images. In this example, the first set of images are determined by the image processing system 108 in response to the search query. Each confidence score of the confidence scores are a sum of a square of a difference of a feature vector associated with the first set of images and a second set of images. An example of an equation to calculate the confidence scores is:

$$d = \sum_{i=0}^{n} (pqcode1_i - pqcode2_i)^2$$

where d is one confidence score of the confidence scores, pqcode1 is a feature vector of the content tag associated with an image of the first set of images, pqcode2 is a feature vector of the content tag associated with an image of the second set of images, and where n is a feature dimension.

At block 306, the process 300 involves identifying a subset of images based on the user profile information, each image of the subset of images being associated with content tags. In some examples, the second set of images are images included in collaborator assets.

At block 308, the process 300 involves generating a recommendation matrix of images based on the BOVWs and the subset of images. In some examples, the recommendation matrix includes rows that correspond to a group of candidate images for a first library of images and columns that correspond to a corpus of images stored in one or more repositories. For instance, in some examples, the first library may be associated with another user's profile (e.g., a collaborator's profile), while the corpus of images includes an entire collection of the requesting user's images. The recommendation matrix, in some examples, includes values calculated by the image processing system 108 such as the WMD that is a measure of how similar two assets are. The recommendation matrix includes any suitable number and type of calculated values for providing unique or personalized thumbnail recommendations. In some examples, the recommendation matrix may be calculated using the WMD, according to any of the techniques described herein.

At block 310, the process 300 involves calculating recommendation scores for each of the images in the recommendation matrix that includes a weighted average of row vectors. The recommendation scores are, in some cases, a sum of the WMD values (discussed with respect to block 210), and weighting is done using a number of factors. These factors include boost values and decay values. Boost values are determined at least in part from a frequency of interaction with each image or each asset, and decay values are determined at least in part by a recency of each image or each asset (e.g., a high recency value would accompany an image or an asset that was just posted).

At block 312, the process 300 involves selecting an image result from the recommendation matrix based on a highest recommendation score. In some examples, more than one candidate image may be presented or selected by the image processing system 108.

Figure 4:
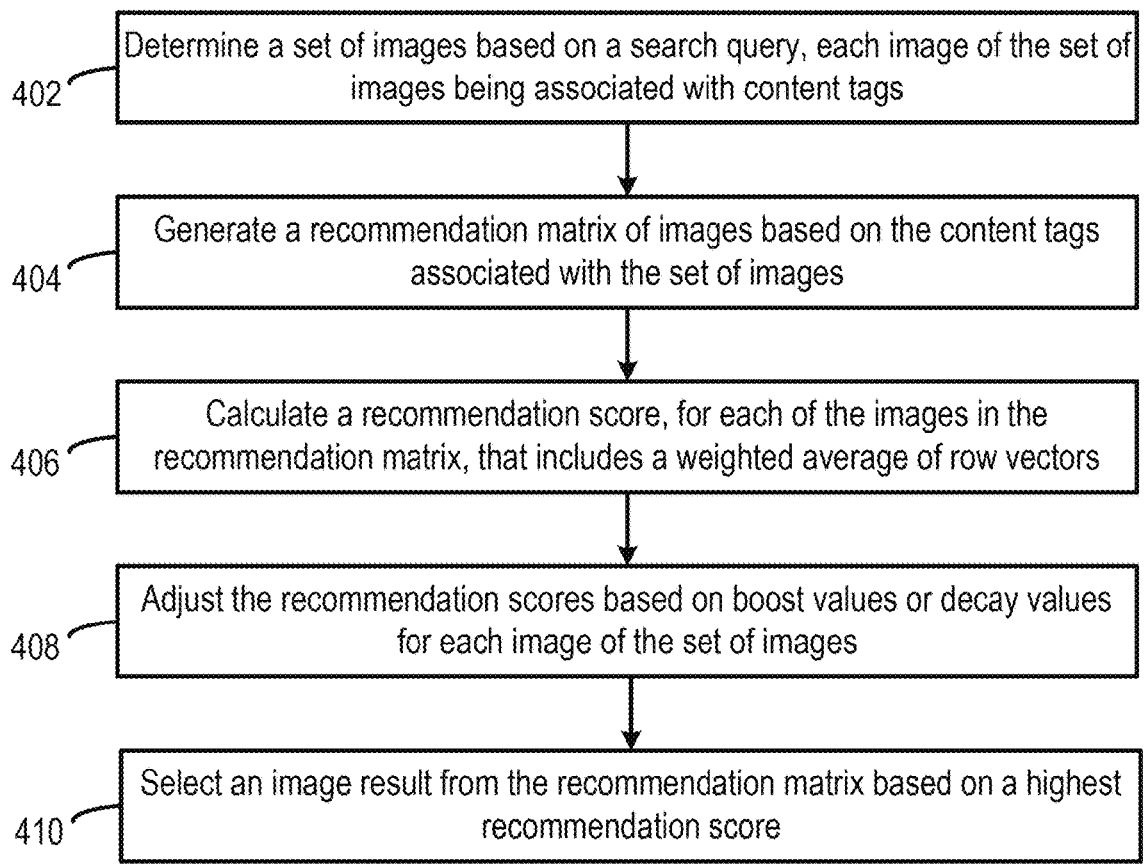
FIG. 4 depicts yet another example of a process for personalized image generation and recommendations, according to certain aspects of this disclosure.

FIG. 4 is an example of a process 400 for personalized image generation and recommendations, according to certain aspects of this disclosure. One or more operations described with respect to FIG. 4 can be used to generate personalized image content recommendations using an image processing system (e.g., image processing system 108). The image processing system 108 executes a trained machine learning model (e.g., trained BOVW model 110) and a recommendation engine 112 to provide personalized image content recommendations according certain aspects discussed herein. One or more processing devices (e.g., computing environment 100) implement operations depicted in FIG. 4 by executing suitable program code (e.g., trained BOVW model 110, recommendation 112, etc.). For illustrative purposes, the process 400 is described with reference to certain examples depicted in the figures. Other implementations, however, are possible.

At block 402, the process 400 involves determining a set of images based on a search query. Each image of the set of images is associated with a content tag. In one example, the image processing system 108 receives a search query from a client device (e.g., client device 102). The image processing system 108 can receive the search query from any of the client devices 102 described above.

At block 404, the process 400 involves generating a recommendation matrix of images based on the content tags associated with the images included in the set of images. The image processing system 108 generates the recommendation matrix according to any of the techniques described herein. In some examples, the recommendation matrix includes rows that correspond to a group of candidate images for a library of images and columns that correspond to a corpus of user images.

At block 406, the process 400 involves calculating recommendation scores for each of the images in the recommendation matrix based on the content tags associated with the set of images. In some examples, the recommendation matrix includes a weighted average of row vectors. The image processing system 108 calculates the recommendation scores according to any of the techniques described herein.

At block 408, the process 400 involves adjusting the recommendation scores for each of the images in the recommendation matrix using boost values, using decay values, or both. The recommendation scores are, in some cases, a sum of the WMD values (discussed with respect to block 210), and weighting is done using a number of factors. These factors include boost values and decay values.

Boost values are determined at least in part from a frequency of interaction with each image or each asset, and decay values are determined at least in part by a recency of each image or each asset (e.g., a high recency value would accompany an image or an asset that was just posted). Boost values increase the recommendation scores and decay values decrease the recommendation scores. In some examples, the boost values and the decay values corresponding to each image are determined by the image processing system 108 based on an interaction frequency of each image and a recency of each image (e.g., how recently an image was added).

At block 410, the process 400 involves selecting a candidate image from the recommendation matrix based on a highest recommendation score. In some examples, more than one candidate image is selected by the image processing system 108.

Figure 5:
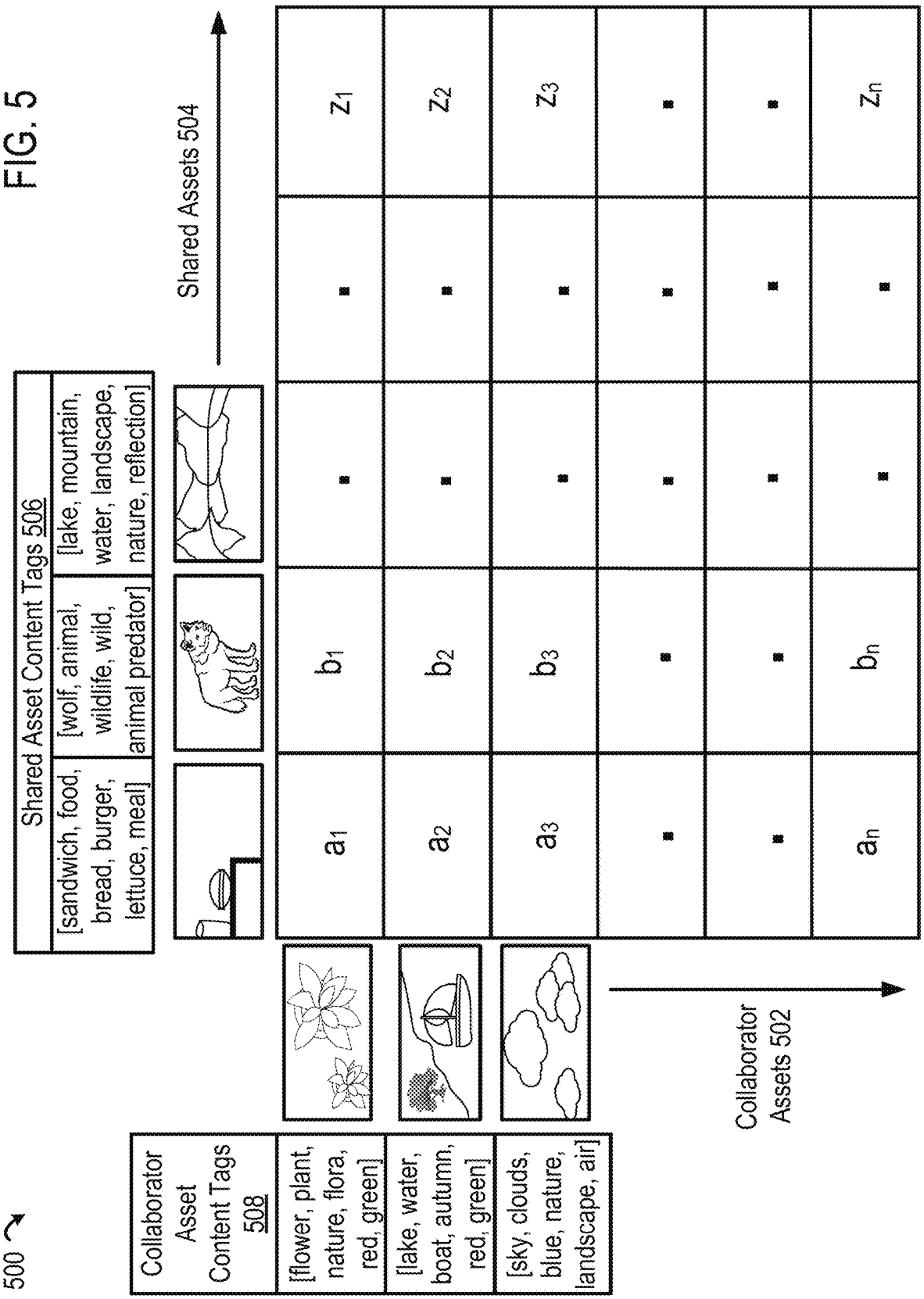
FIG. 5 depicts an example of a recommendation matrix for personalized image generation and recommendations, according to certain aspects of this disclosure.

FIG. 5 depicts an example of a recommendation matrix 500 for personalized image generation and recommendations, according to certain aspects of this disclosure. As illustrated in the recommendation matrix 500, there is a vertical axis 502 and a horizontal axis 504 representing collaborator assets and shared library assets, respectively. In this example, the collaborator assets are images (or other assets) that are included in a first set of images (e.g., the first set of images described at block 206 of the process 200), and the shared library assets are images (or other assets) that are included in a second set of images (e.g., the second set of images described at block 208 of the process 200). Images of the first set of images and images of the second set of images are associated with content tags, such as shared asset content tags 506 representing [sandwich, food, bread, burger, lettuce, meal], and in some examples, the content tags are used to determine recommendation scores (discussed further with respect to FIG. 6).

FIG. 5 shows the recommendation matrix 500, which includes a set of cells having values $a_1$, $a_2$, $b_1$, etc. In some examples, these values are calculated by the image processing system 108 and each represent a WMD that is a similarity score of two assets. For example, the value $a_1$ is the WMD value that represents how similar an image with shared asset content tags 506 [sandwich, food, bread, burger, lettuce, meal] is in comparison to an image with collaborator asset content tags 508 [flower, plant, nature, flora, red, green]. Any suitable number of WMD values may be used for generating or otherwise determining the recommendation matrix 500.

Figure 6:
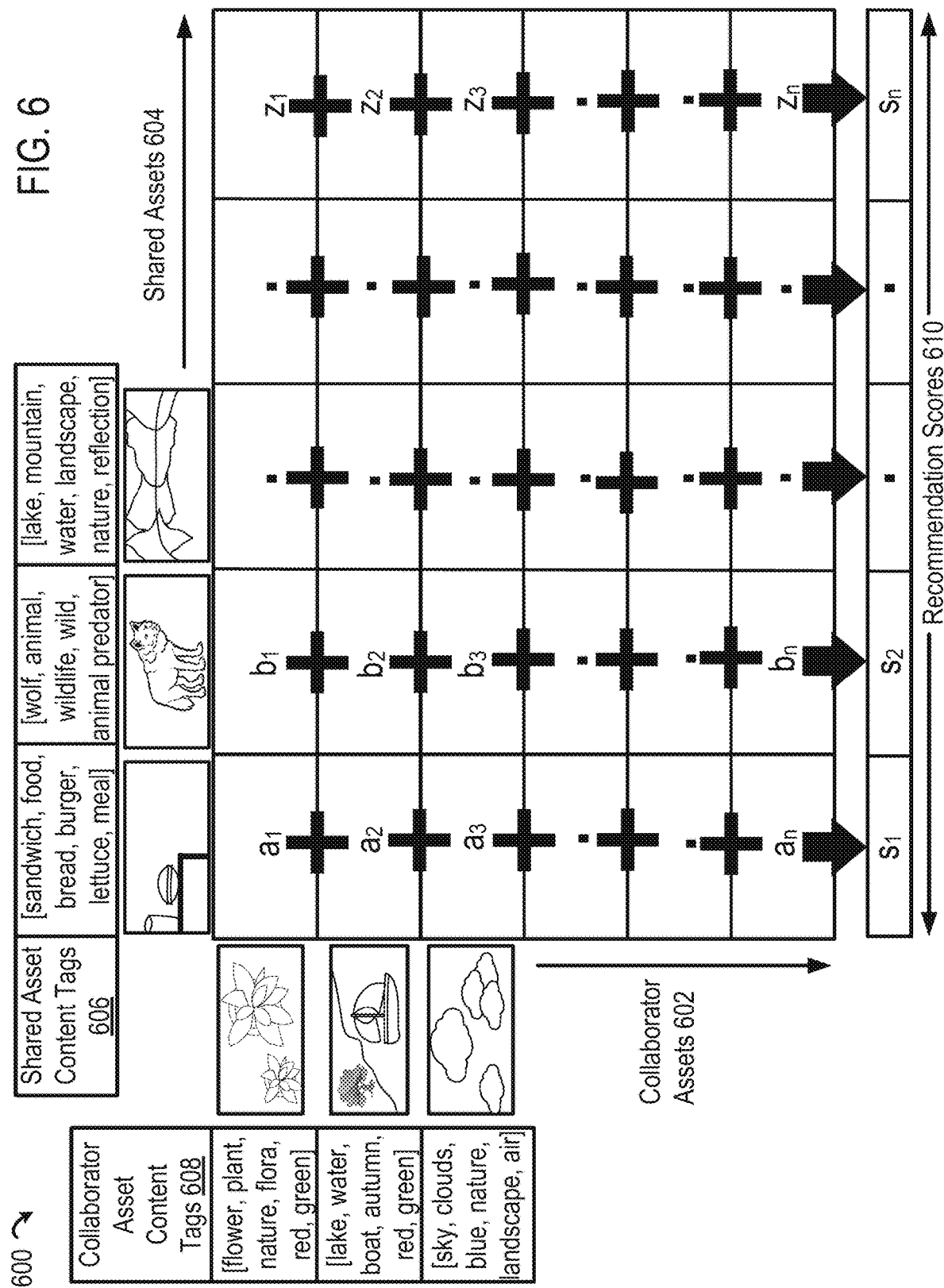
FIG. 6 depicts another example of a recommendation matrix for personalized image generation and recommendations, according to certain aspects of this disclosure.

FIG. 6 depicts another example of a recommendation matrix 600 for personalized image generation and recommendations, according to certain aspects of this disclosure. In some examples, the recommendation matrix 600 is similar or identical to the recommendation matrix 500 of FIG. 5. In this example, the recommendation matrix 600 includes a vertical axis 602 and a horizontal axis 604 representing collaborator assets and shared library assets, respectively. In this example, the collaborator assets are images (or other assets) that are included in a first set of images (e.g., the first set of images described at block 206 of the process 200), and the shared library assets are images (or other assets) that are included in a second set of images (e.g., the second set of images described at block 208 of the process 200). Images of the first set of images and images of the second set of images are associated with content tags, such as shared asset content tags 606 [sandwich, food, bread, burger, lettuce, meal] or collaborator asset content tags 608 [flower, plant, nature, flora, red, green], and in some examples, the content tags are used to determine recommendation scores 610.

The recommendation scores 610 are weighted values for determining which images (or other assets) are candidates for thumbnails. In some examples, the image processing system 108 calculates WMD values for each cell in the recommendation matrix 600. In response to calculating the WMD values, the image processing system 108 weights each score based on a set of external factors such as decay (determined by recency), boost (determined by frequency of interaction), and the like. In applying these weights, the image processing system 108 not only determines which assets are similar but also determines which assets are more likely to be interacted with by collaborators. Any suitable number of recommendation scores 610 may be determined in response to the creation of the recommendation matrix 600.

Figure 7:
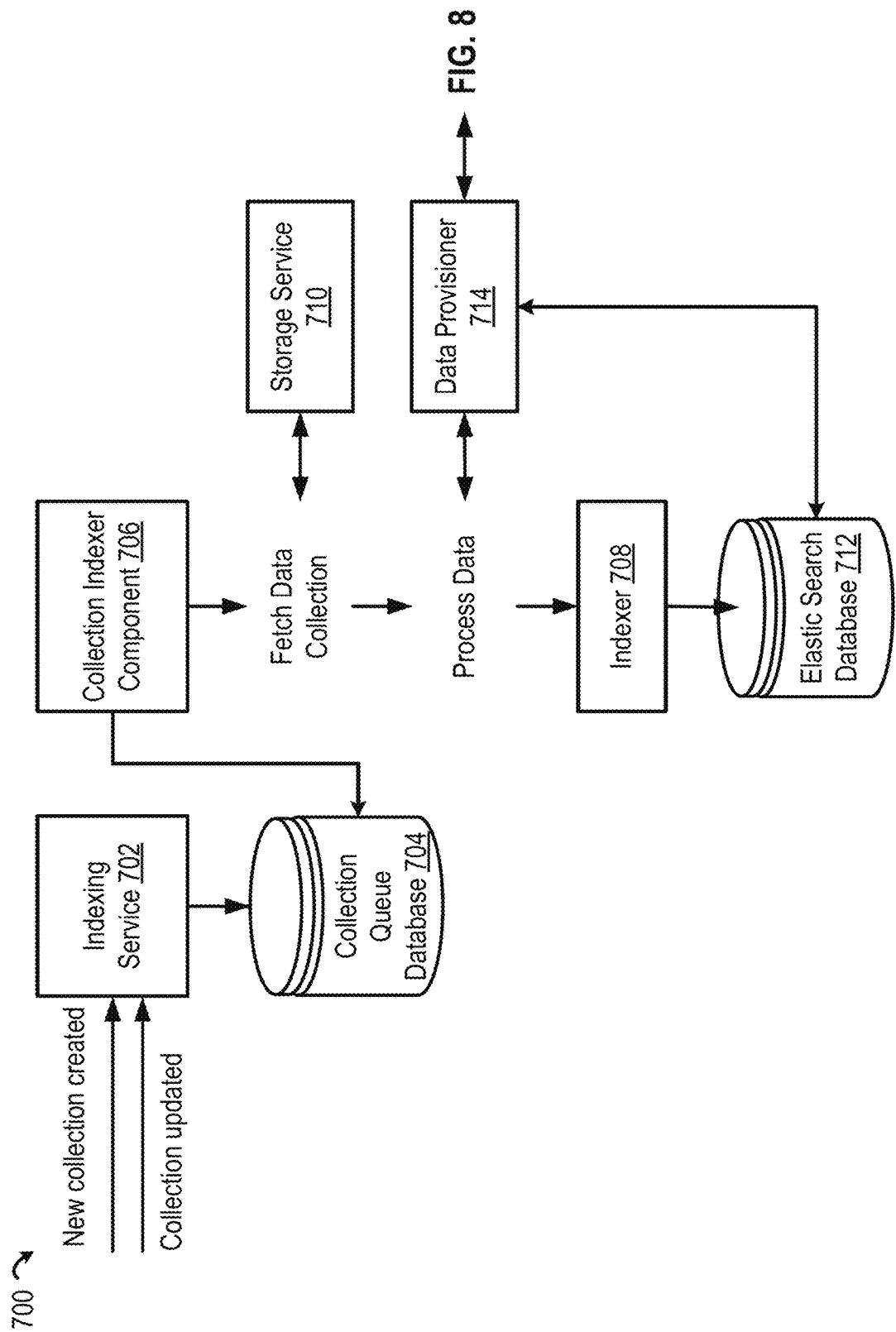
FIG. 7 depicts an example of a flow diagram for a computing environment for personalized image generation and recommendations, according to certain aspects of this disclosure.

FIG. 7 depicts an example flow diagram 700 for a computing environment for personalized image generation and recommendations, according to certain aspects of this disclosure. In some examples, the image processing system 108 initiates a work flow that follows the example flow diagram 700 when a new collection of assets is created, when an existing collection of assets is updated, or other similar instance. The image processing system 108 then calls out an indexing service 702 that is communicatively coupled to a collection queue database 704. In some examples, the collection queue database 704 stores information relating to the assets (e.g., sets, groups, collections, or repositories of images). For example, the collection queue database 704 stores collaborator assets, shared library assets, content tags, or a combination of these, etc. The collection queue database 704 is communicatively coupled to a collection indexer component 706 that, in some examples, is configured to execute a fetch data collection. In some examples, executing the collection indexer component 706 fetches data collection that allows the image processing system 108 to interface with a storage service (e.g., storage service 710) that is used to storing information relating to the collection of assets.

The image processing system 108 processes data for the newly created collection or an updated collection. For example, the image processing system 108 processes the data collection that was fetched from the storage service 710. The image processing system 108 processes data, for example, by calculating recommendation scores (e.g., recommendation scores 610) and weighting the recommendation scores, and the like. In some examples, the processing data yields a set of unique or personalized thumbnails for the collection of assets. Upon completion of the data processing, the image processing system 108 interacts with an indexer 708. The indexer 708 is communicatively coupled to an elastic search database 712 that contains searchable sets, groups, collections, or repositories of assets. In some examples, the indexer 708 stores the collection of assets having unique or personalized thumbnails in the elastic search database 712. In other examples, the image processing system 108 is in communication with a data provisioner 714 that is communicatively coupled to a personalized thumbnail generation ("PTG") service 802, which is described below, with respect to FIG. 8. Additionally, or in the alternative, the data provisioner 714 is communicatively coupled to the elastic search database 712. The elastic search database 712 also stores data that is acquired from the PTG service 802.

Figure 8:
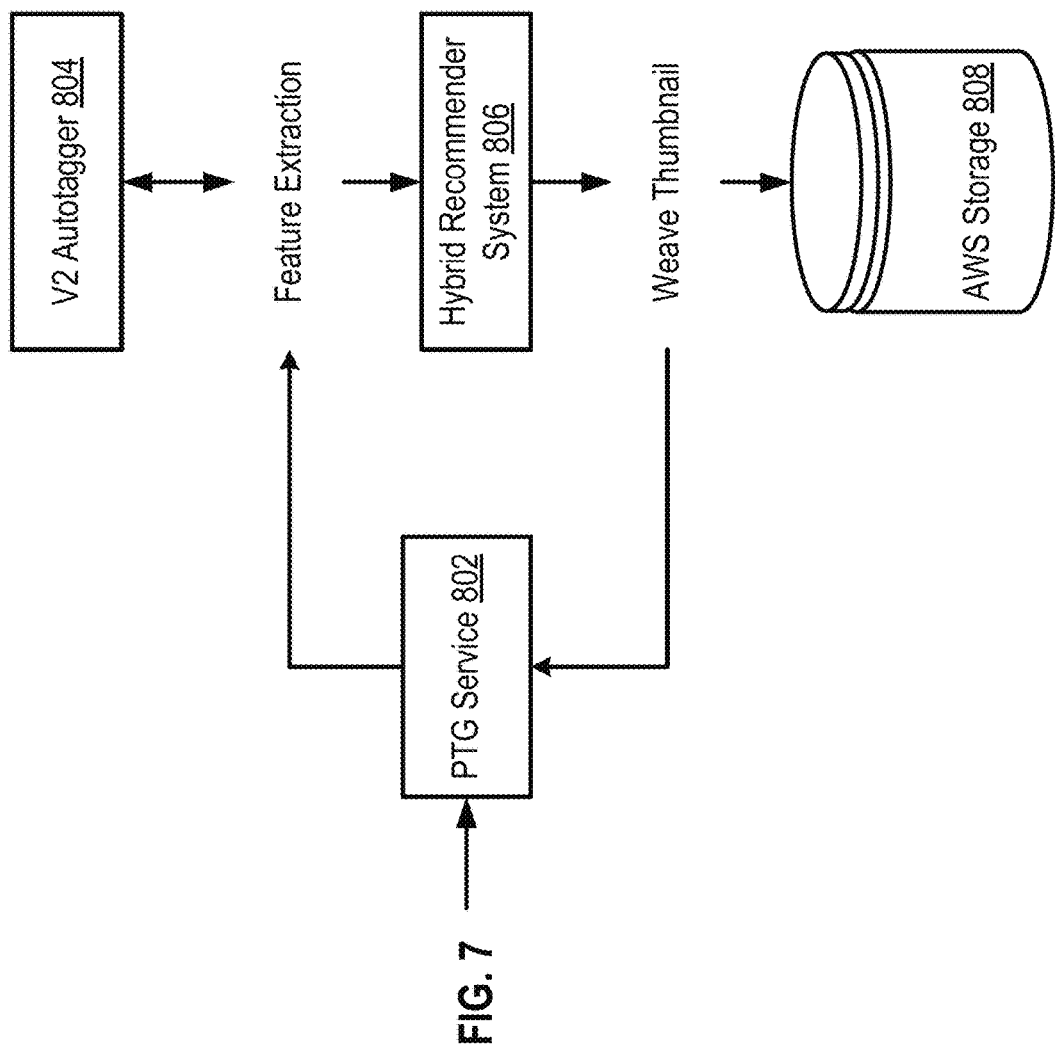
FIG. 8 depicts another example of a flow diagram for a computing environment for personalized image generation and recommendations, according to certain aspects of this disclosure.

FIG. 8 depicts another example flow diagram 800 for a computing environment for personalized image generation and recommendations, according to certain aspects of this disclosure. The PTG service 802, in some examples, is communicative coupled to the data provisioner 714 of FIG. 7. The PTG service 802 performs functions, such as feature extractions and weaving thumbnails. The PTG service 802 aids in indexing a rendition link for the collection of assets. In some examples, the image processing system 108 uses the PTG service 802 to execute a feature extraction command. In this example, the image processing system 108 extracts features such as content tags. The image processing system 108 extracts these features from each of the assets in the collection of assets. The image processing system 108 subsequent uses these features according to any of the techniques described herein.

In one example, the image processing system 108 interfaces with an autotagger (e.g., V2 autotagger 804) to extract content tags. Subsequently, the image processing system 108 uses a hybrid recommender system 806 to produce recommendation scores (e.g., recommendation scores 610) for each of the assets in the collection of assets. In some examples, the hybrid recommender system 806 generates the recommendation scores using the extracted content tags. The image processing system 108 then weaves thumbnails into the collection of assets. For example, the image processing system weaves thumbnails based on a highest recommendation score. Further, in some examples, each thumbnail is unique, personalized, or both. The weaved thumbnails are stored in an AWS storage system 808, by the image processing system 108, for later use or indexing purposes. For example, the image processing system 108 can retrieve weaved thumbnails in response to a user input, user request, search request, query, etc. Additionally or alternatively, the image processing system 108 sends the unique and/or personalized weaved thumbnails to the PTG service 802, In turn, the PTG service 802 sends the weaved thumbnails to the data provisioner 714, e.g., shown in FIG. 7. In such an example, the data provisioner 714 saves the weaved for subsequent use, e.g., by storing the weaved thumbnails in elastic search database 712. In other examples, the image processing system 108 provides the weaved thumbnails in response to a search query using the data provisioner 714.

In some examples, FIGS. 7 and 8 each represent one half of a single example flow diagram for a computing environment for personalized image generation and recommendations. Thus, it should be appreciated that, in some examples, the flow diagrams shown in FIGS. 7 and 8 are combined.

Example Computing System for Image Processing

Figure 9:
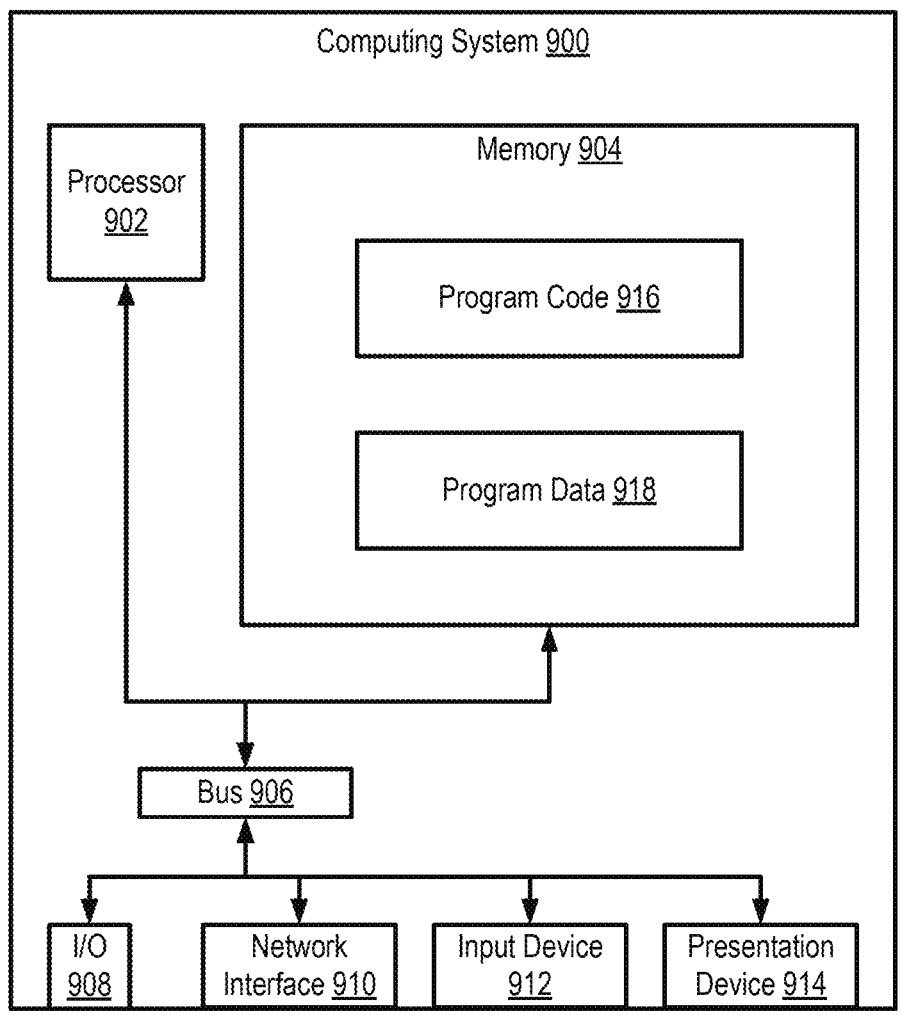
FIG. 9 depicts an example of a computing system that can perform certain operations described herein, according to certain aspects of this this disclosure.

Any suitable computing system can be used for performing the operations described herein. FIG. 9 depicts an example computing system 900 that can perform certain operations described herein, according to certain aspects of this disclosure. In some aspects, the computing system 900 executes image processing system 108 of FIG. 1. In other aspects, separate computing systems having devices similar to those depicted in FIG. 9 (e.g., a processor, a memory, etc.) separately execute parts of the image processing system 108.

The example computing system 900 includes a processor 902 communicatively coupled to one or more memory devices 904. The processor 902 executes computer-executable program code 916 stored in a memory device 904, accesses information (e.g., program data 918) stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The computing system 900 also includes a number of external or internal devices, such as input or output devices. For example, the computing system 900 is shown with one or more input/output ("I/O") interfaces 908. An I/O interface 908 can receive input from input devices (e.g., input device 912) or provide output to output devices. One or more buses 906 are also included in the computing system 900. The bus 906 communicatively couples one or more components of a respective one of the computing system 900.

The computing system 900 executes program code 916 that configures the processor 902 to perform one or more operations described herein. In some examples, the program code 916 includes program code for the trained BOVW model 110, the collaboration module 114, the content analysis module 116, the prediction module 118, or other suitable applications to perform operations described herein. The program code 916 may be resident in the memory device 904 or any suitable computer-readable medium and may be executed by the processor 902 or another suitable processor.

In additional or alternative aspects, the program code 916 described above is stored in one or more other memory devices accessible via data network 104.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and/or the like. The computing system 900 is able to communicate with one or more other computing devices via data network 104 using the network interface device 910.

In some aspects, the computing system 900 also includes presentation device 914. A presentation device 914 can include any device or group of devices for providing visual, auditory, or other suitable sensory output. Non-limiting examples of presentation device 914 include a touchscreen, a monitor, a speaker, a separate mobile computing device, etc. In some aspects, presentation device 914 can include a remote client-computing device, such as client device 102, that communicates with computing system 900 using one or more data networks (e.g., data network 104) described herein. Other aspects can omit presentation device 914.

General Considerations

While the present subject matter has been described in detail with respect to specific aspects thereof, it will be appreciated that those skilled in the art, upon attaining an understanding of the foregoing, may readily produce alterations to, variations of, and equivalents to such aspects. Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. Accordingly, this disclosure has been presented for the purpose of providing examples rather than limitation, and does not preclude the inclusion of such modifications, variations, and/or additions to the present subject matter as would be readily apparent to one of ordinary skill in the art.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Aspects of the methods disclosed herein may be performed in the operation of such computing devices. The systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, script, or other type of language or combinations of languages may be used to implement the teachings herein in software to be used in programming or configuring a computing device. The order of the blocks presented in the examples above can be varied—e.g., blocks can be re-ordered, combined, and/or broken into sub-blocks. Certain blocks or processes can be performed in parallel.

The invention claimed is:

1. A method in which one or more processing devices perform operations comprising:
   receiving a search query comprising a keyword, wherein the search query is associated with a user profile;
   generating a recommendation matrix comprising a set of images based on (a) an area of interest determined from the search query and the user profile and (b) content tags associated with the images;
   calculating a recommendation score for a candidate image included in the recommendation matrix, wherein the recommendation score comprises a weighted average of row vectors of the recommendation matrix;
   including the candidate image in a search result for the search query based on the recommendation score; and
   generating, for display, the search result with the candidate image.

2. The method of claim 1, the operations further comprising:
   generating the content tags for each image using a trained machine learning model by identifying a set of feature vectors for each image;
   generating a Pqcode for the feature vectors, wherein the Pqcode comprises an encoded representation of a respective feature vector;
   grouping a corpus of images into clusters of images based on a similarity; and
   identifying the set of images based in part on the Pqcode and the clusters.

3. The method of claim 1, wherein calculating the recommendation score comprises:
   computing a word mover's distance for word embeddings using the content tags associated with the images in the recommendation matrix.

4. The method of claim 1, the operations further comprising:
   selecting a plurality of candidate images from among the recommendation matrix based on a set of recommendation scores; and
   generating, for display, the search result using the plurality of candidate images.

5. The method of claim 4, the operations further comprising:
   ordering a display of the search result according to the recommendation scores.

6. The method of claim 1, the operations further comprising:
   selecting a set of collaborator profiles that includes a shared area of interest; and
   determining a weight to be applied for the weighted average of row vectors based on the shared area of interest.

7. The method of claim 6, the operations further comprising:
   retrieving relevance scores respectively associated with the collaborator profiles; and
   adjusting the weight to be applied for the weighted average of row vectors based on the relevance scores.

8. The method of claim 1, wherein the user profile comprises a user history, and the operations further comprising:
   determining a plurality of areas of interest associated with the user profile based on the user history;
   ranking the plurality of areas of interest based on recency information; and
   determining a weight to be applied for the weighted average of row vectors based on the rankings of the recency information.

9. The method of claim 1, wherein the user profile comprises a user history, and the operations further comprising:
   determining a plurality of areas of interest associated with the user profile based on the user history;
   ranking the plurality of areas of interest based on recency information; and
   selecting a set of collaborator profiles from a plurality of user profiles associated with a shared area of interest; and
   determining the weight to be applied for the weighted average of row vectors using both of the set of collaborator profiles and the recency information.

10. The method of claim 1, wherein the user profile comprises a user history, and wherein generating the recommendation matrix comprises:
    determining similarity metrics that include a word mover's distance (WMD) for the images by computing a similarity between the user history and the images; and
    selecting the set of images based on the similarity metric exceeding a threshold similarity value.

11. A system comprising:
    one or more processing devices; and
    a non-transitory computer-readable medium communicatively coupled to the one or more processing devices and storing instructions, wherein the one or more processing devices are configured to execute the instructions and thereby perform operations comprising:
      receiving a search query comprising a keyword, wherein the search query is associated with a user profile;
      generating a recommendation matrix comprising a set of images based on (a) an area of interested determined from the search query and the user profile and (b) content tags associated with the images;
      calculating a recommendation score for a candidate image included in the recommendation matrix, wherein the recommendation score comprises a weighted average of row vectors of the recommendation matrix;
      including the candidate image in a search result for the search query based on the recommendation score; and
      generating, for display, the search result.

12. The system of claim 11, the operations further comprising:
    generating the content tags for each image using a trained machine learning model by identifying a set of feature vectors for each image;
    generating a Pqcode for the feature vectors, wherein the Pqcode comprises an encoded representation of a respective feature vector;

grouping a corpus of images into clusters of images based on a similarity; and identifying the set of images using the Pqcode and the clusters.

13. The system of claim 11, the operations further comprising:

selecting a plurality of candidate images from among the recommendation matrix based on a set of recommendation scores;

generating, for display, the search result using the plurality of candidate images; and ordering a display of the search result according to the recommendation scores.

14. The system of claim 11, the operations further comprising:

selecting a set of collaborator profiles that includes a shared area of interest;

determining a weight to be applied for the weighted average of row vectors based on the shared area of interest;

retrieving relevance scores respectively associated with the collaborator profiles; and adjusting the weight to be applied for the weighted average of row vectors based on the relevance scores.

15. The system of claim 11, wherein the user profile comprises a user history, and the operations further comprising:

determining a plurality of areas of interest associated with the user profile based on the user history;

ranking the plurality of areas of interest based on recency information; and selecting a set of collaborator profiles from a plurality of user profiles associated with a shared area of interest; and determining the weight to be applied for the weighted average of row vectors using both of the set of collaborator profiles and the recency information.

16. A non-transitory computer-readable medium communicatively coupled to one or more processing devices and storing instructions, wherein the one or more processing devices are configured to execute the instructions and thereby perform operations comprising:

receiving a search query comprising a keyword, wherein the search query is associated with a user profile;

selecting a set of images based on the keyword;

determining an area of interest based on both of the search query and the user profile;

generating a recommendation matrix comprising a subset of the set of images based on the area of interest determined from the search query and the user profile;

calculating a recommendation score for a candidate image in the recommendation matrix, wherein the recommendation score comprises a weighted average of row vectors of the recommendation matrix, and wherein the weight to be applied for the weighted average of row vectors is based on recency information;

including the candidate image in the search result for the search query based on the recommendation score; and generating, for display, the search result.

17. The non-transitory computer-readable medium of claim 16, the operations further comprising:

generating content tags for each image using a trained machine learning model, wherein the trained machine learning model is configured to identify a set of feature vectors for each image;

generating a Pqcode for the feature vectors, wherein the Pqcode comprises an encoded representation of a respective feature vector;

grouping a corpus of images into clusters of images based on a similarity; and identifying the set of images using the Pqcode and the clusters.

18. The non-transitory computer-readable medium of claim 16, the operations further comprising:

selecting a plurality of candidate images from among the recommendation matrix based on a set of recommendation scores;

generating, for display, the search result using the plurality of candidate images; and ordering a display of the plurality of candidate images according to the recommendation scores.

19. The non-transitory computer-readable medium of claim 16, the operations further comprising:

selecting a set of collaborator profiles that includes a shared area of interest;

determining a weight to be applied for the weighted average of row vectors based on the shared area of interest;

retrieving relevance scores respectively associated with the collaborator profiles; and adjusting the weight to be applied for the weighted average of row vectors based on the relevance scores.

20. The non-transitory computer-readable medium of claim 16, wherein the user profile comprises a user history, and the operations further comprising:

determining a plurality of areas of interest associated with the user profile based on the user history;

ranking the plurality of areas of interest based on recency information; and selecting a set of collaborator profiles from a plurality of user profiles associated with a shared area of interest; and determining the weight to be applied for the weighted average of row vectors using both of the set of collaborator profiles and the recency information.

* * * * *